United States Patent
Gupta et al.

(10) Patent No.: US 10,860,707 B2
(45) Date of Patent: Dec. 8, 2020

(54) SYSTEMS AND METHODS FOR OBFUSCATION OF PASSWORD KEY AND DYNAMIC KEY POOL MANAGEMENT

(71) Applicant: Dell Products L.P., Round Rock, TX (US)

(72) Inventors: Chitrak Gupta, Bangalore (IN); Sushma Basavarajaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 298 days.

(21) Appl. No.: 15/843,153

(22) Filed: Dec. 15, 2017

(65) Prior Publication Data

US 2019/0188373 A1 Jun. 20, 2019

(51) Int. Cl.
| | | |
|---|---|---|
| *G06F 21/45* | (2013.01) | |
| *H04L 9/08* | (2006.01) | |
| *G06F 21/62* | (2013.01) | |
| *G06F 21/31* | (2013.01) | |

(52) U.S. Cl.
CPC .......... *G06F 21/45* (2013.01); *G06F 21/6245* (2013.01); *H04L 9/0863* (2013.01); *H04L 9/0869* (2013.01); *H04L 9/0891* (2013.01); *G06F 21/31* (2013.01)

(58) Field of Classification Search
CPC ....................................................... G06F 21/45
See application file for complete search history.

(56) References Cited

U.S. PATENT DOCUMENTS

| | | | |
|---|---|---|---|
| 9,813,414 B2* | 11/2017 | Camenisch | H04L 63/083 |
| 2005/0144484 A1* | 6/2005 | Wakayama | G06F 21/31 726/19 |
| 2015/0172275 A1* | 6/2015 | Milya | H04L 63/0846 726/6 |
| 2015/0269369 A1* | 9/2015 | Hamid | G06F 9/4401 726/5 |
| 2016/0261586 A1* | 9/2016 | Huang | G06T 11/60 |
| 2017/0329944 A1* | 11/2017 | Satyavarapu | H04L 63/10 |
| 2018/0309577 A1* | 10/2018 | Newcombe | H04L 9/0643 |

* cited by examiner

*Primary Examiner* — Simon P Kanaan
(74) *Attorney, Agent, or Firm* — Jackson Walker L.L.P.

(57) ABSTRACT

In accordance with embodiments of the present disclosure, an information handling system may include a processor and a non-transitory computer-readable medium having stored thereon a program of instructions executable by the processor. The program of instructions may be configured to, when read and executed by the processor, receive an initial password, the initial password comprising a string of characters to be entered by a user of the information handling system for accessing the information handling system, separate the initial password into a plurality of compartments, select a random order of the plurality of compartments, generate a key based on the initial password as rearranged in accordance with the random order of the plurality of compartments, and store a key sequence representative of the random order of the plurality of compartments.

20 Claims, 4 Drawing Sheets

SYSTEMS AND METHODS FOR OBFUSCATION OF PASSWORD KEY AND DYNAMIC KEY POOL MANAGEMENT

TECHNICAL FIELD

The present disclosure relates in general to information handling systems, and more particularly to methods and systems for obfuscating a password key and dynamic management of a key pool.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, user passwords are often used to protect access to information handling systems and their various components. However, because password keys are often stored in memory of information handling systems, such keys may be compromised by interlopers using techniques to maliciously obtain the keys.

SUMMARY

In accordance with the teachings of the present disclosure, the disadvantages and problems associated with key storage and maintenance in an information handling system may be reduced or eliminated.

In accordance with embodiments of the present disclosure, an information handling system may include a processor and a non-transitory computer-readable medium having stored thereon a program of instructions executable by the processor. The program of instructions may be configured to, when read and executed by the processor, receive an initial password, the initial password comprising a string of characters to be entered by a user of the information handling system for accessing the information handling system, separate the initial password into a plurality of compartments, select a random order of the plurality of compartments, generate a key based on the initial password as rearranged in accordance with the random order of the plurality of compartments, and store a key sequence representative of the random order of the plurality of compartments.

In accordance with these and other embodiments of the present disclosure, a method may include receiving an initial password, the initial password comprising a string of characters to be entered by a user of an information handling system for accessing the information handling system, separating the initial password into a plurality of compartments, selecting a random order of the plurality of compartments, generating a key based on the initial password as rearranged in accordance with the random order of the plurality of compartments, and storing a key sequence representative of the random order of the compartments.

In accordance with these and other embodiments of the present disclosure, a an article of manufacture may include a non-transitory computer-readable medium and computer-executable instructions carried on the computer readable medium, the instructions readable by a processor. The instructions, when read and executed, may cause the processor to receive an initial password, the initial password comprising a string of characters to be entered by a user of an information handling system for accessing the information handling system, separate the initial password into a plurality of compartments, select a random order of the plurality of compartments, generate a key based on the initial password as rearranged in accordance with the random order of the plurality of compartments, and store a key sequence representative of the random order of the plurality of compartments.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
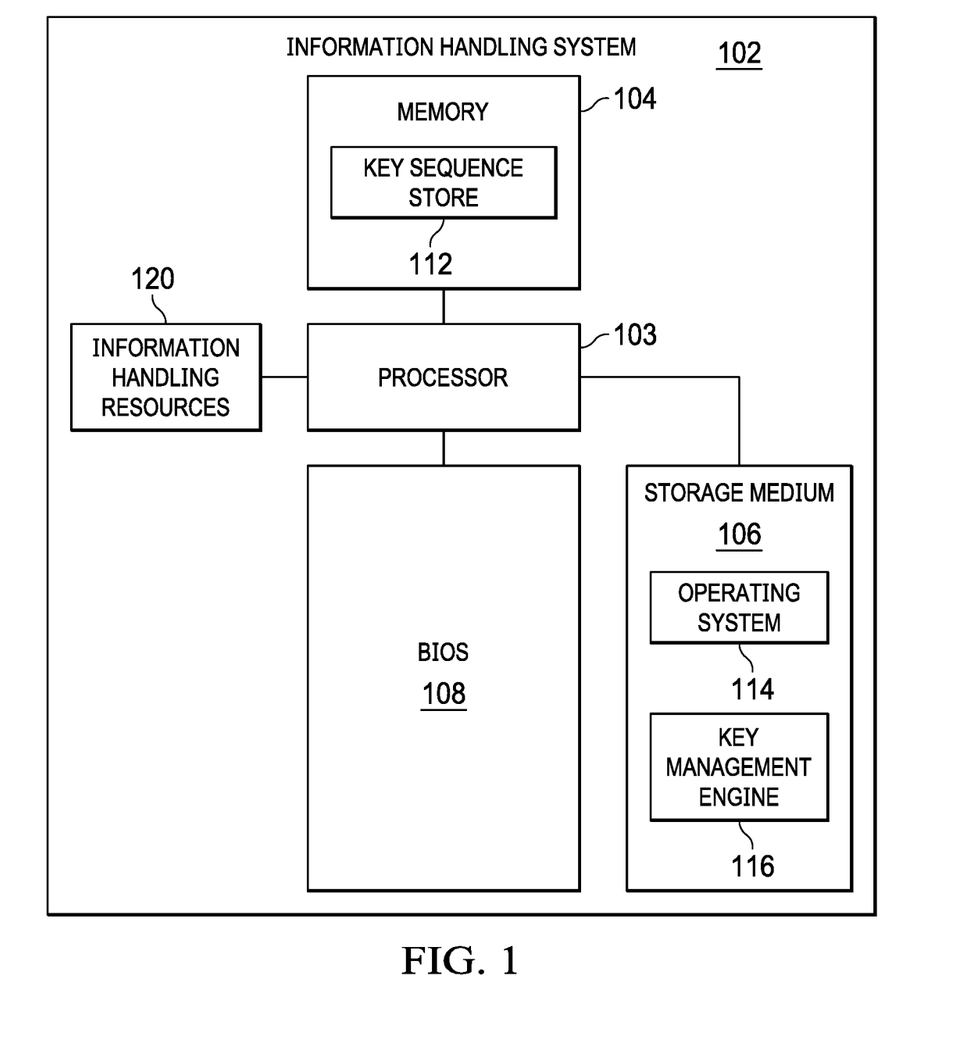
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a storage medium 106 communicatively coupled to processor 103, a basic input/output system (BIOS) 108 communicatively coupled to processor 103, and one or more other information handling resources 120 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage medium 106, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a key sequence store 112 configured to store a key sequence associated with a key for accessing information handling system 102 and/or one or more of its components, as described in greater detail elsewhere in this disclosure.

Storage medium 106 may be communicatively coupled to processor 104 and may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114, and a key management engine 116.

OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

Key management engine 116 may comprise a program of instructions configured to, when loaded into memory 104 and executed by processor 103, perform one or more tasks related to creation of a key from a user password, management of a key generated from a user password, and access control to information handling system 102 and/or its components in response to receipt of purported user passwords, as is described in greater detail elsewhere in this disclosure.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., operating system 114 or other application programs) stored on compatible media (e.g., memory 104, storage medium 106) may be executed by processor 103 and given control of information handling system 102.

In operation, as described in more detail elsewhere in this disclosure, key management engine 116 may be configured to receive an initial user password from a user (e.g., an administrator or end user) of information handling system 102 and from such user password, generate a key and obfuscate such password and key by generating a randomized key sequence and storing such randomized key sequence in memory 104 with key sequence store 112, rather than storing the password or the key in memory 104. In addition, as described in more detail elsewhere in this disclosure, key management engine 116 may be configured to manage the key generated from the user password, including periodic rekeying without user intervention based on the user password in accordance with a policy. Furthermore, as described in more detail elsewhere in this disclosure, key management engine 116 may be configured to control access to information handling system 102 and its components by receiving a password attempt and determining from the stored key sequence whether a string entered in a password attempt matches a previously-entered initial password set by a user.

Figure 2:
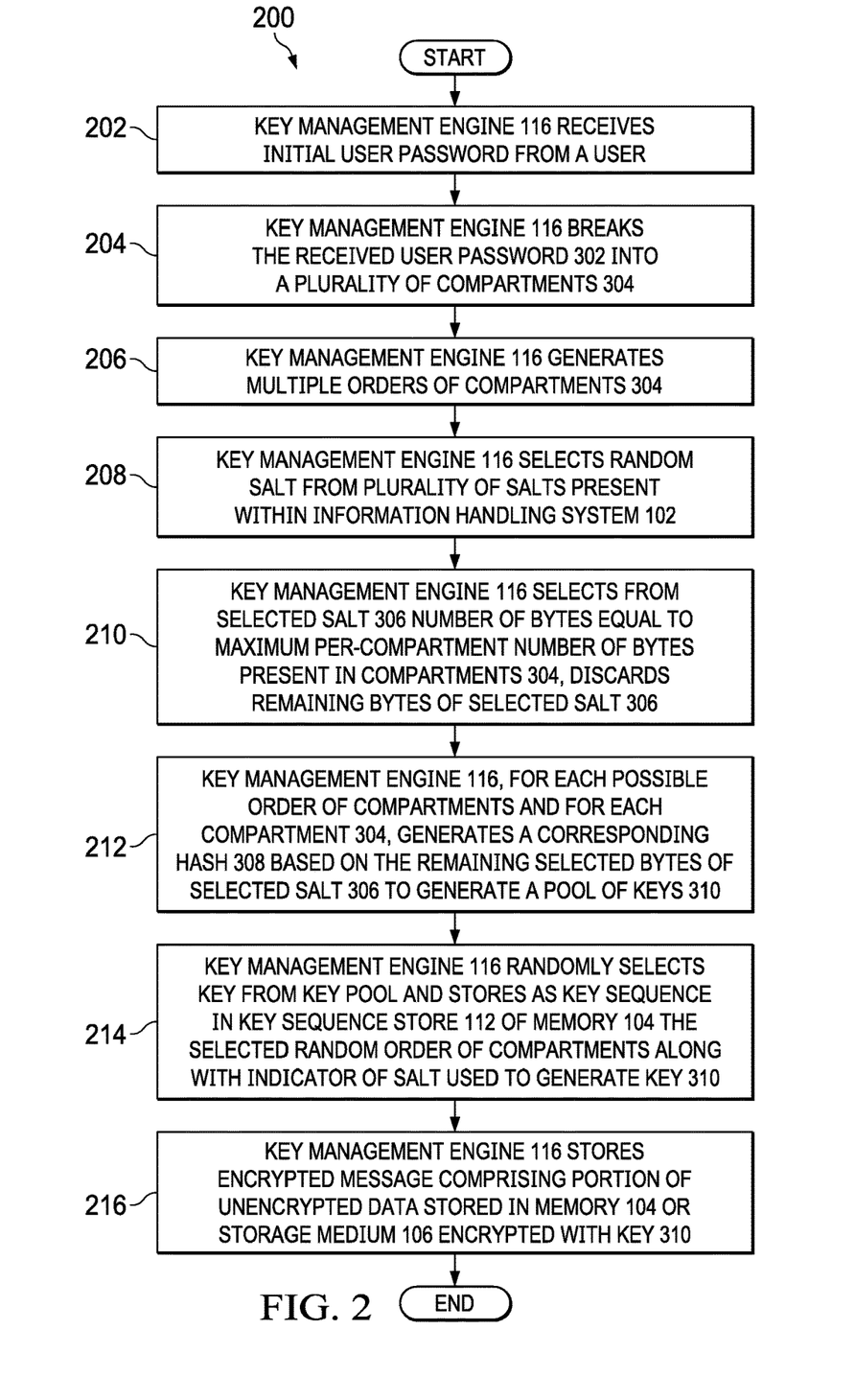
FIG. 2 illustrates a flow chart of an example method for generating a key and key sequence from a user password, in accordance with embodiments of the present disclosure.

FIG. 2 illustrates a flow chart of an example method 200 for generating a key and key sequence from a user password, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

Figure 3:
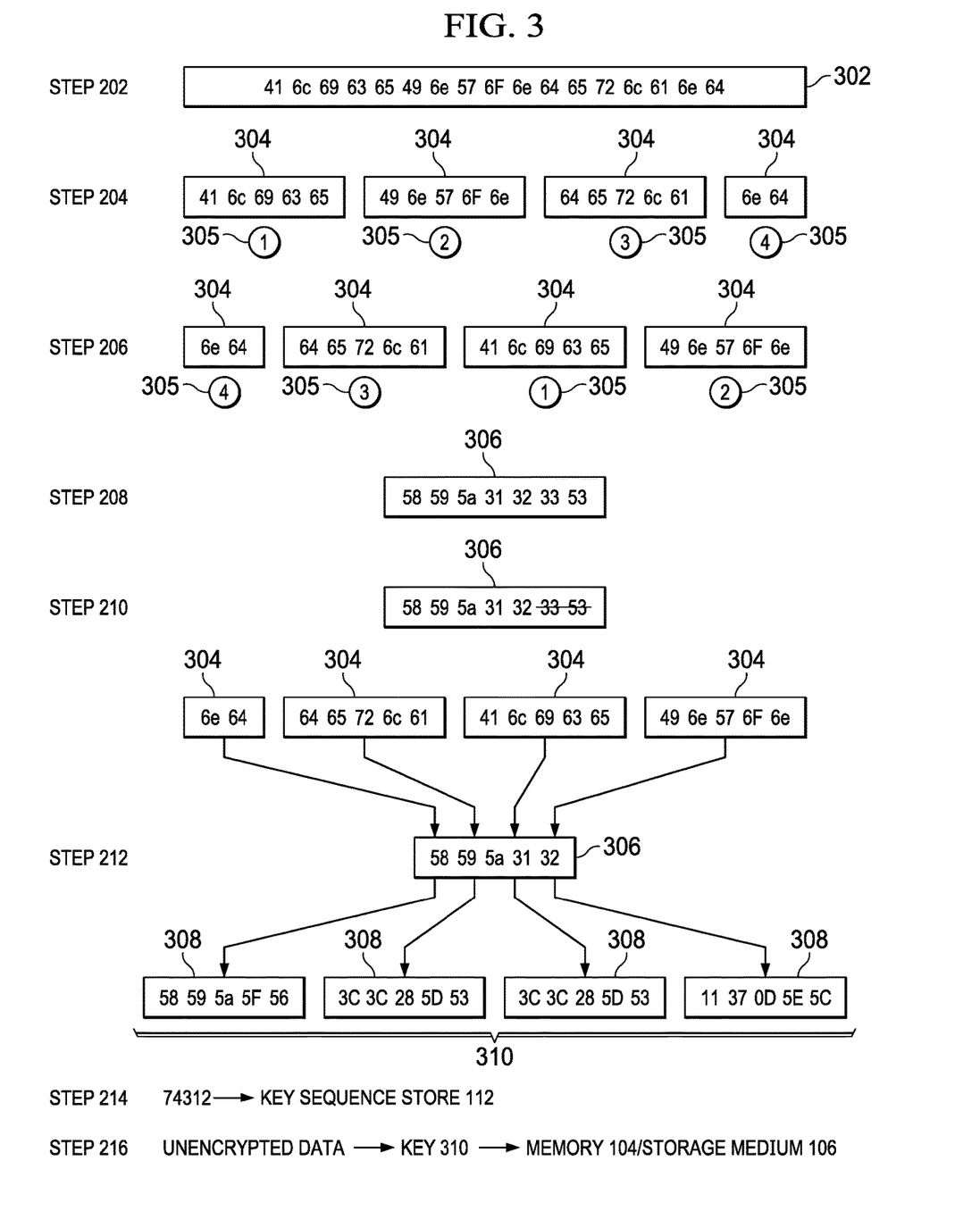
FIG. 3 illustrates a graphical depiction of an example of generation of a key and key sequence from a user password, in accordance with embodiments of the present disclosure.

FIG. 3 is an illustration depicting an example of generation of a key and key sequence from a user password, in accordance with embodiments of the present disclosure, and is discussed alongside method 200 of FIG. 2 to better illustrate execution of method 200.

At step 202, key management engine 116 may receive an initial (e.g., new) user password from a user. In some instances, the initial user password may be a password entered by a user on first use of information handling system 102 after deployment of information handling system 102. In other instances, the initial user password may be a subsequent password set by the user which is different from the password entered by the user on first use or different from a previous password set by the user. For purposes of the graphical example of FIG. 3, it is assumed that the initial password 302 is the phrase "AliceInWonderland" which may be represented in ASCII in hexadecimal notation as 416c696365496e576f6e6465726c616e64.

At step 204, key management engine 116 may break the received user password 302 into a plurality of compartments 304 as shown in FIG. 3, and identify each compartment with a number or other identifier 305. For purely illustrative purposes, FIG. 3 depicts password 302 broken into four compartments. However, any suitable number N of compartments may be used.

At step 206, key management engine 116 may generate N! (N-factorial) orders of compartments 304 and thus N! associated password strings. For purposes of clarity of exposition, only one of such possible orders of compartments, 4312, and its associated text string is shown in FIG. 3.

At step 208, key management engine 116 may select a random salt from a plurality of salts present within information handling system 102. A salt may comprise any string of immutable data present within information handling system 102, including a unique identifier such as a service tag number, a global unique identifier (QUID), a serial number, or any other suitable immutable data associated with information handling system 102. It is assumed that a service tag of XYZ123S is selected as the random salt 306, which may be represented in ASCII in hexadecimal notation as 58595a31323353.

At step 210, key management engine 116 may select from the selected salt 306 a number of bytes equal to the maximum per-compartment number of bytes present in compartments 304, and discard the remaining bytes of selected salt 306. In the example shown in FIG. 3, key management engine 116 does so by selecting the most significant bytes of selected salt 306 and discarding the least significant bytes. In other embodiments, a different approach may be used to select the bytes of selected salt 306 to use (e.g., using the least significant bytes and discarding the most significant bytes).

At step 212, key management engine 116 may, for each compartment 304 of each of the N! combinations of password strings, generate a corresponding hash 308 based on the remaining selected bytes of selected salt 306. For each possible order of compartments, the resulting hashes 308 may, in the order of the compartments 304 (e.g., 4312 for the example order of compartments shown in FIG. 3) be concatenated to generate a key 310. Thus, key management engine may create a pool of N! keys.

At step 214, key management engine 116 may select a key from the pool of N! keys and store as a key sequence in key sequence store 112 of memory 104 the selected random order of compartments for the selected key(e.g., 4312 of the example of FIG. 3) along with an indicator of which salt was used to generate key 310. For example, in the example of FIG. 3, if selected salt 306 is identified as salt number 7 in information handling system 102, then key management engine 116 may store "74312" as the key sequence in key sequence store 112 of memory 104.

At step 216, key management engine 116 may also store (e.g., to memory 104 or storage medium 106) an encrypted message, wherein the encrypted message comprises a portion of unencrypted data stored in memory 104 or storage medium 106 encrypted with key 310. After completion of step 216, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 4:
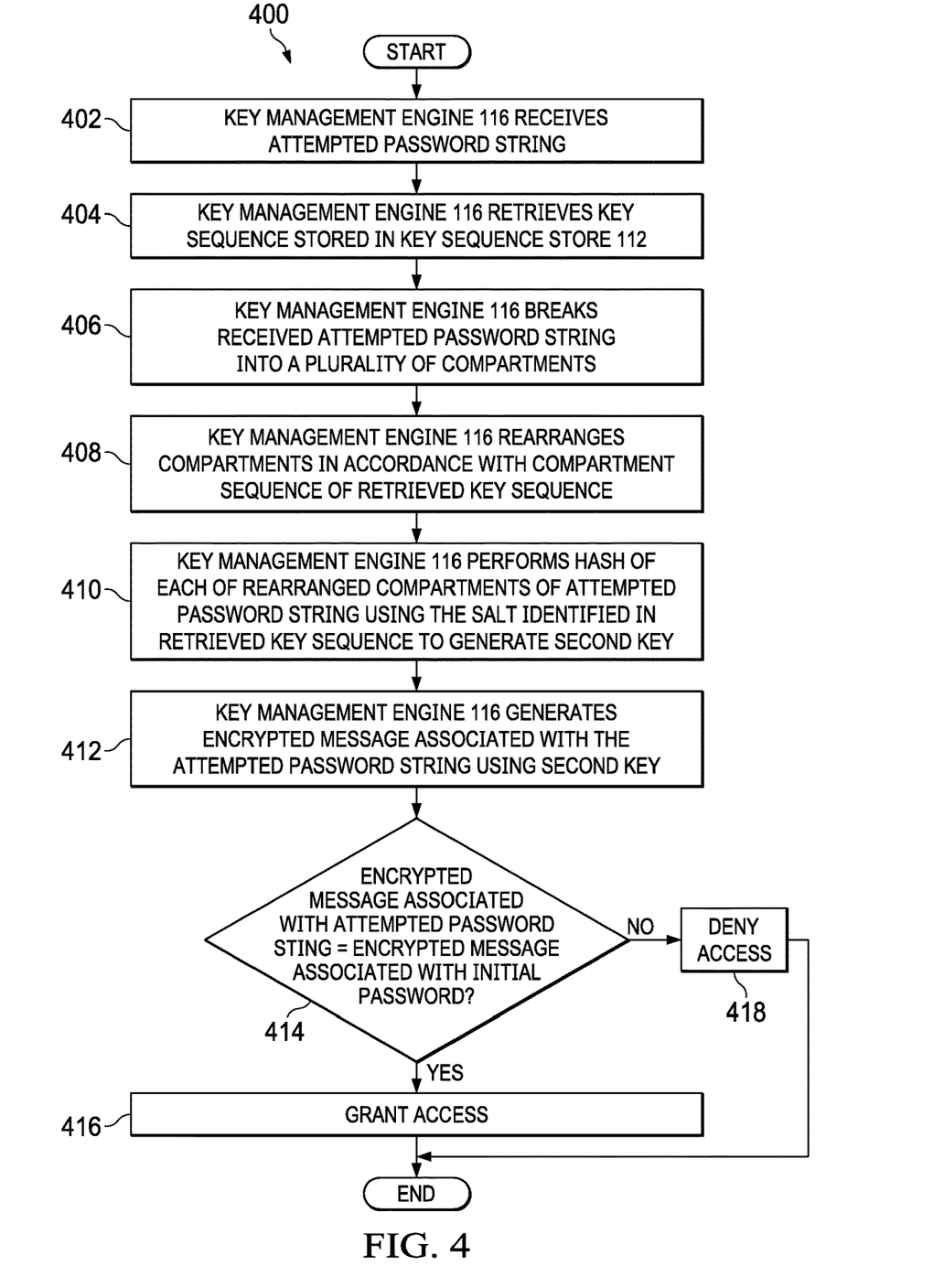
FIG. 4 illustrates a flow chart of an example method for verifying a password attempt, in accordance with embodiments of the present disclosure.

FIG. 4 illustrates a flow chart of an example method 400 for verifying a password attempt, in accordance with embodiments of the present disclosure. According to some embodiments, method 400 may begin at step 402. As noted above, teachings of the present disclosure may be implemented in a variety of configurations of information handling system 402. As such, the preferred initialization point for method 400 and the order of the steps comprising method 400 may depend on the implementation chosen.

At step 402, key management engine 116 may receive an attempted password string in connection with an attempted access to information handling system 102.

At step 404, key management engine 116 may retrieve the key sequence stored in key sequence store 112 of memory 104, which sets forth the salt and the compartment sequence of the previously set password used to generate the key.

At step 406, key management engine 116 may break the received attempted password string into a plurality of compartments, similar to the operation of step 204 of method 200. At step 408, key management engine 116 may rearrange the compartments in accordance with the compartment sequence of the previously set password used to generate the key, as set forth in the retrieved key sequence. At step 410, key management engine 116 may perform a hash of each of the rearranged compartments of the attempted password string using the salt identified in the key sequence retrieved from key sequence store 112. The result of such hash is a second key associated with the attempted password string.

At step 412, key management engine 116 may generate an encrypted message associated with the attempted password string, wherein the encrypted message associated with the attempted password string comprises the portion of unencrypted data used to generate the encrypted message associated with the initial password in step 216 of method 200 encrypted by the second key. At step 414, key management engine 116 may compare the encrypted message associated with the attempted password string to the encrypted message associated with the initial password. If the encrypted message associated with the attempted password string matches the encrypted message associated with the initial password, method 400 may proceed to step 416, at which key management engine 116 may grant the attempted access to information handling system 102. Otherwise, if the encrypted message associated with the attempted password string does not match the encrypted message associated with the initial password, method 400 may proceed to step 418, at which key management engine 116 may deny the attempted access to information handling system 102. After completion of either step 416 or step 418, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

In addition to the functionality described above, key management engine 116 may also enforce a key rotation policy. To illustrate, if a password is broken into N compartments, for a given salt, N! unique keys can be created. Thus, from one password supplied, numerous keys can be created. Advantageously, any key can be picked at random, and only the key sequence need be stored, as described above. Due to the availability of multiple keys, key management engine 116 may set a key rotation policy in which after a certain time, a new key is picked from the pool of N! possible entries. When that happens, key management engine 116 may generate the existing key from the key sequence stored in key sequence store 112 and a new sequence which does not match the existing sequence may be randomly picked. In some embodiments, the key rotation policy may define a refresh rate of keys which determines after how many key iterations an older (already used) key may be used again.

The password management approach disclosed herein may be applied to information handling system 102 of any component thereof. For example the approach disclosed herein may be applied to self-encrypting drives (local key management mode) or other secure passwords of an information handling system. Such approach may protect from forensic extraction of text passwords and cold attacks on memory for retrieval of passwords.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a non-transitory computer-readable medium having stored thereon a program of instructions executable by the processor, the program of instructions configured to, when read and executed by the processor:
   receive an initial password, the initial password comprising a string of characters to be entered by a user of the information handling system for accessing the information handling system;
   separate the initial password into a plurality of compartments, each compartment comprising a plurality of characters of the string of characters;
   select a random order of the plurality of compartments from a plurality of potential orders;
   generate a key based on the initial password as rearranged in accordance with the random order of the plurality of compartments; and
   store a key sequence representative of the random order of the plurality of compartments, wherein the key sequence includes information that specifies which of the plurality of potential orders is selected as the random order.

2. The information handling system of claim 1, wherein generating the key comprises:
   selecting a salt comprising a string of immutable data associated with the information handling system; and using the salt to perform a hash on the initial password as reordered in accordance with the random order of the plurality of compartments to generate the key.

3. The information handling system of claim 2, wherein the program of instructions is further configured to, when read and executed by the processor, encrypt with the key a portion of data stored within the information handling system in order to generate a message associated with the initial password.

4. The information handling system of claim 3, wherein the program of instructions is further configured to, when read and executed by the processor, store the message associated with the initial password.

5. The information handling system of claim 3, wherein the program of instructions is further configured to, when read and executed by the processor:
- receive an attempted password string;
- separate the attempted password string into a second plurality of compartments;
- rearrange the second plurality of compartments in accordance with the key sequence;
- use the salt to perform a hash on the attempted password string as rearranged in accordance with the key sequence to generate a second key;
- encrypt with the second key the portion of data stored within the information handling system in order to generate a message associated with the attempted password string; and
- grant or deny access to the information handling system based on a comparison of the message associated with the initial password with the message associated with the attempted password string.

6. The information handling system of claim 2, wherein the program of instructions is further configured to, when read and executed by the processor, enforce a key rotation policy defining when and how to generate a new key sequence and update the key based on the generation of the new key sequence.

7. A method comprising:
- receiving an initial password, the initial password comprising a string of characters to be entered by a user of an information handling system for accessing the information handling system;
- separating the initial password into a plurality of compartments, each compartment comprising a plurality of characters of the string of characters;
- selecting a random order of the plurality of compartments from a plurality of potential orders;
- generating a key based on the initial password as rearranged in accordance with the random order of the plurality of compartments; and
- storing a key sequence representative of the random order of the compartments, wherein the key sequence includes information that specifies which of the plurality of potential orders is selected as the random order.

8. The method of claim 7, wherein generating the key comprises:
- selecting a salt comprising a string of immutable data associated with the information handling system; and
- using the salt to perform a hash on the initial password as reordered in accordance with the random order of the plurality of compartments to generate the key.

9. The method of claim 8, further comprising encrypting with the key a portion of data stored within the information handling system in order to generate a message associated with the initial password.

10. The method of claim 9, further comprising storing the message associated with the initial password.

11. The method of claim 9, further comprising:
- receiving an attempted password string;
- separating the attempted password string into a second plurality of compartments;
- rearranging the second plurality of compartments in accordance with the key sequence;
- using the salt to perform a hash on the attempted password string as rearranged in accordance with the key sequence to generate a second key;
- encrypting with the second key the portion of data stored within the information handling system in order to generate a message associated with the attempted password string; and
- granting or denying access to the information handling system based on a comparison of the message associated with the initial password with the message associated with the attempted password string.

12. The method of claim 8, further comprising enforcing a key rotation policy defining when and how to generate a new key sequence and update the key based on the generation of the new key sequence.

13. An article of manufacture comprising:
- a non-transitory computer-readable medium; and
- computer-executable instructions carried on the computer-readable medium, the instructions readable by a processor, the instructions, when read and executed, for causing the processor to:
  - receive an initial password, the initial password comprising a string of characters to be entered by a user of an information handling system for accessing the information handling system;
  - separate the initial password into a plurality of compartments, each compartment comprising a plurality of characters of the string of characters;
  - select a random order of the plurality of compartments from a plurality of potential orders;
  - generate a key based on the initial password as rearranged in accordance with the random order of the plurality of compartments; and
  - store a key sequence representative of the random order of the plurality of compartments, wherein the key sequence includes information that specifies which of the plurality of potential orders is selected as the random order.

14. The article of manufacture of claim 13, wherein generating the key comprises:
- selecting a salt comprising a string of immutable data associated with the information handling system; and
- using the salt to perform a hash on the initial password as reordered in accordance with the random order of the plurality of compartments to generate the key.

15. The article of manufacture of claim 14, the instructions for further causing the processor to, when read and executed by the processor, encrypt with the key a portion of data stored within the information handling system in order to generate a message associated with the initial password.

16. The article of manufacture of claim 15, the instructions for further causing the processor to, when read and executed by the processor, store the message associated with the initial password.

17. The article of manufacture of claim 15, the instructions for further causing the processor to, when read and executed by the processor:
- receive an attempted password string;

separate the attempted password string into a second plurality of compartments;

rearrange the second plurality of compartments in accordance with the key sequence;

use the salt to perform a hash on the attempted password string as rearranged in accordance with the key sequence to generate a second key;

encrypt with the second key the portion of data stored within the information handling system in order to generate a message associated with the attempted password string; and grant or deny access to the information handling system based on a comparison of the message associated with the initial password with the message associated with the attempted password string.

18. The article of manufacture of claim 14, the instructions for further causing the processor to, when read and executed by the processor, enforce a key rotation policy defining when and how to generate a new key sequence and update the key based on the generation of the new key sequence.

19. The information handling system of claim 2, wherein the salt is selected from a plurality of potential salts, and wherein the key sequence further includes information usable to identify which of the plurality of potential salts is selected as the salt.

20. The information handling system of claim 1, wherein the key sequence does not include the key, the initial password, or the initial password as rearranged.

\* \* \* \* \*